United States Patent [19]

Roden et al.

[11] 4,049,183
[45] Sept. 20, 1977

[54] WELDING BACK-UP TAPE

[75] Inventors: William A. Roden, Rancho Santa Fe; Glenn L. Criger, San Diego, both of Calif.

[73] Assignee: General Dynamics Corporation, San Diego, Calif.

[21] Appl. No.: 689,416

[22] Filed: May 24, 1976

[51] Int. Cl.² .............................................. B23K 9/02
[52] U.S. Cl. ..................... 228/50; 156/293; 428/36; 428/188; 428/228; 428/354
[58] Field of Search ................. 228/50, 216; 128/156, 128/155; 428/36, 40, 188, 354, 920; 156/293

[56] References Cited
U.S. PATENT DOCUMENTS

| | | | |
|---|---|---|---|
| 2,362,505 | 11/1944 | Smith | 228/50 |
| 2,792,626 | 5/1957 | Chyle | 228/216 |
| 3,001,057 | 9/1961 | Hackman et al. | 228/216 X |
| 3,299,890 | 1/1967 | Parker | 128/156 |
| 3,365,566 | 1/1968 | Kuder | 228/216 X |
| 3,494,020 | 2/1970 | Cornell | 228/216 |

*Primary Examiner*—Al Lawrence Smith
*Assistant Examiner*—K. J. Ramsey
*Attorney, Agent, or Firm*—John R. Duncan

[57] ABSTRACT

An improved back-up tape for use in fusion welding aluminum sheets and structures is disclosed. The tape comprises a small diameter, heavy wall, flexible woven refractory fiber tube within a slightly larger diameter similar tube, both partially flattened against an adhesive coated surface of a wider, heat resistant, strip. In use, the tape is pressed against the back side of a joint to be welded with the adhesive bonding the tape along strips parallel to but slightly spaced from the joint. The joint is fusion welded without the addition of any filler wire. A flat weld underbead, with no molten metal drop-through is produced, with no melting or other significant change in the tape. The tape is then stripped off and the welded structure is ready for use.

14 Claims, 2 Drawing Figures

WELDING BACK-UP TAPE

BACKGROUND OF THE INVENTION

This invention relates in general to the welding of aluminum and similar materials and, more specifically, to an improved back-up tape for use in such welding.

In butt welding thin sheets or structures together, a number of problems may be encountered. Welding such structures without support along the weld line opposite the welding head is generally unsatisfactory. Molten metal from the weld zone tends to drop through, leaving voids along the weld line. Also, the underside of the weld tends to be uneven, with droplet-like projections.

Attempts have been made to support weld lines with solid structures, which, while useful in some cases, are not adaptable to a variety of structure and sheet shapes. Tape-like support means of various kinds have also been used, adhesively bonded along the weld line. The surfaces of some back-up tapes are intended to fuse during the welding operation, and may include a surface layer of a flux. This type tape is undesirable in high quality aerospace-type applications where the weld must be free of contamination.

Other commercial tapes, while satisfactory for rough work or where the weld bead is to be finish machined, do not provide adequate support to produce highly uniform, smooth weld beads. In some cases, local failure of the tape from thermal weakening or melting will permit drop through of the fused metal, leaving insufficient metal to form a satisfactory bead, especially where no metal is added during welding.

In order to provide sufficient support, many tapes require a rigid back-up plate pressing the tape against the weld underbead. In welding complex structures, such as long tubes, it is inconvenient to attempt to hold the tape in place with a solid member. Since the solid backing member must conform to the surface being welded, a special backing member must be built for each structure design being welded.

Other backing strips or tapes may include a metal or solid refractory strip to provide rigid support. These tapes are complex, heavy, difficult to install and will conform to curved weld surfaces of only large radii of curvature.

Thus, there is a continuing need for improved welding back-up tapes especially for use in welding aluminum to high quality standards.

OBJECTS OF THE INVENTION

An object, therefore, of this invention is to provide a welding back-up tape overcoming the above-noted problems.

Another object of this invention is to provide a welding back-up tape of improved simplicity, reliability and versatility.

A further object of this invention is to provide a welding back-up tape capable of producing a smooth, contamination-free, underbead in fusion welded aluminum.

SUMMARY OF THE INVENTION

The above objects, and others, are accomplished in accordance with this invention, by a welding back-up tape comprising a woven refractory (fiberglass or similar material) strip having an adhesive coating on one side and one or more (preferably two) concentric woven fiberglass or other non-reactive refractory material sleeves, in contact with the adhesive coating and aligned with the longitudinal centerline of the strip. When pressed against the strip, the sleeves partially flatten, leaving an adhesive margin along both edges of the sleeves.

In use, the tape is pressed against the underside of the weld line, with the sleeves aligned with the weld line and the adhesive margins removably bonding the tape assembly to the structure being welded. During welding, the sleeves exert a substantially uniform pressure across the weld line, producing a very flat underbead. The sleeve material is not fused during welding, so that support is maintained and weld metal drop-through and weld contamination are prevented. After welding, the tape is stripped away, leaving a clean, uniform and uncontaminated surface.

BRIEF DESCRIPTION OF THE DRAWING

Details of the invention, and of a preferred embodiment thereof, will be further understood upon reference to the drawing, wherein.

DETAILED DESCRIPTION OF THE INVENTION

Figure 1:
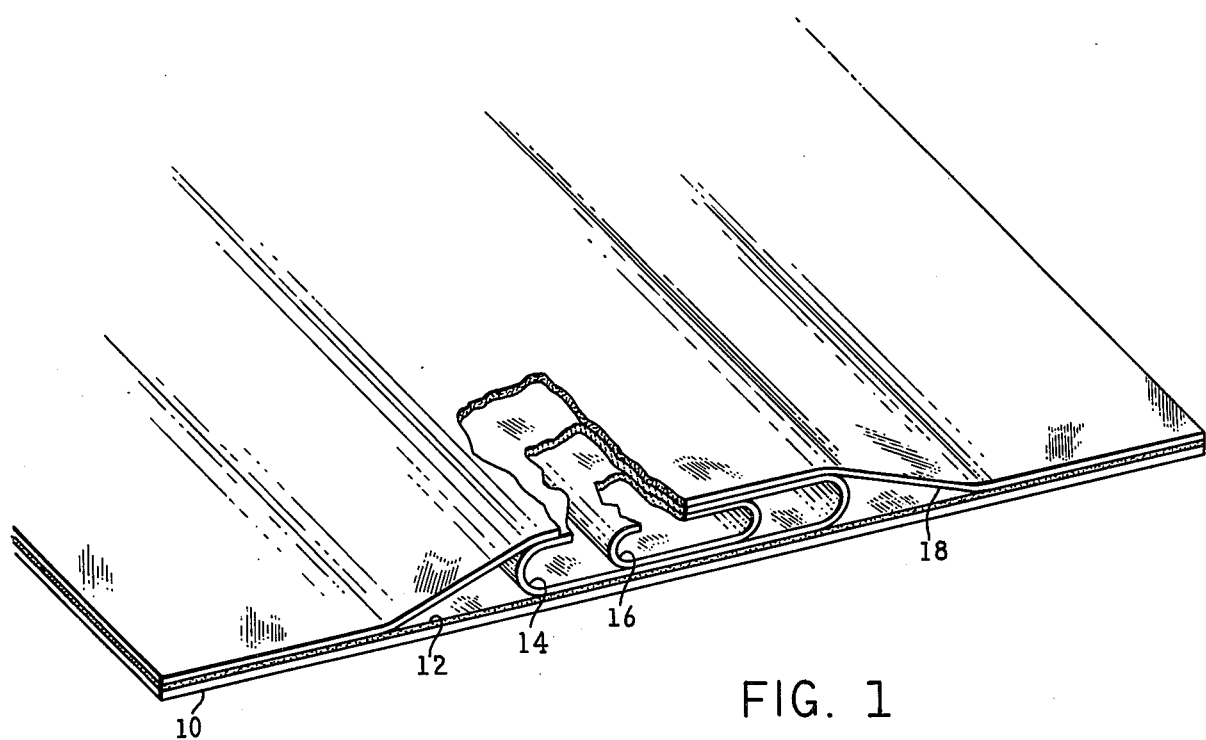
FIG. 1 is a perspective view of the welding back-up tape, partly cut-away for clarity.

Referring now to FIG. 1 there is seen a perspective view of a welding back-up tape, partly cut-away for clarity. The tape comprises an elongated strip 10 having a adhesive coating 12 on one side. A first woven refractory fiber sleeve 14 is bonded to adhesive coating 12 substantially along the center line of strip 10. A second, smaller diameter, woven refractory fiber sleeve 16 is located within first sleeve 14. To permit the assembled tape to be easily handled, a cover sheet 18 is placed over the tape in contact with the adhesive margins adjacent to sleeve 14. Cover sheet 18 is stripped away just before the tape is used.

Strip 10 may comprise any suitable material. Typical materials include refractory fiber fabric (such as woven fiberglass fabrics) metal foil, high temperature resistant plastics and combinations thereof. Best results are generally obtained with woven refractory fiber fabric strips, since they are flexible and easily conform to complex shapes and resist welding temperatures without degradation. If desired, other coatings, such as a thin aluminum layer, may be applied to either surface of strip 10 to enhance the high temperature or other characteristics of the strip. Strip 10 may have any suitable dimensions. Generally a thickness of from about 0.003 to 0.010 inch and a width of from about 1 to 3 inches give good results. The length may be indefinite, since the tape may be coiled and portions cut off as needed. For the usual welding of aluminum structures, optimum results are obtained with tape widths in the about 2 to 3 inch range.

Any suitable adhesive may be used in forming coating 12 on strip 10. Typical adhesives include tacky pressure sensitive coatings, heat activated adhesives, water or solvent activated adhesives, etc. Pressure sensitive adhesives are preferred for ease and simplicity of bonding the tape to structures to be welded.

Where a pressure sensitive adhesive is used for coating 12, a cover sheet 18 is preferably used during handling and storage of the tape. Typical cover sheets include paper, cloth or plastic sheets having a surface coating, such as a silicone resin, which adheres only lightly to adhesive layer 12. Where adhesive layer is non-tacky under storage conditions but is tackified by heat, water or solvent just prior to use, cover sheet 18 may be omitted.

Sleeves 14 and 16 may comprise any suitable high temperature resistant non-metallic fibers that are not melted or significantly degraded at the welding temperatures. Such fibers are generally referred to as "refractory fibers". Typical sleeve materials include glass, quartz, and ceramic fibers and mixtures thereof. While glass fibers are preferred when welding aluminum, fibers having higher temperature resistance may be preferred when welding other metals at higher temperatures. First woven refractory fiber sleeve 14 may have any suitable dimensions and physical characteristics. Best results when welding aluminum are obtained with fiber sleeves of continuous woven Volon glass fibers, 2 under, 2 over, 16 weaves per inch, about 0.015 inch thick and weighing about 17 grams per running meter of length, available from the Varglas Corporation. First sleeve 14 preferably has a circumference of from about 1.5 to 3.0 inches in order to provide the optimum support to the weld underbead. The ratio of first sleeve 14 circumference to strip 10 width is preferably from about 0.2 to 1.0 to give optimum support to the sleeve while providing optimum adhesive margins in contact with the structure being welded.

Second woven refractory fiber sleeve 16 may also have any suitable physical characteristics and dimensions. The characteristics of this inner sleeve should be similar to those described above for the outer sleeve. For optimum weld line support, the ratio of the circumference of second, inner, sleeve 16 to that of first, outer, sleeve 14 should be in the about 0.5 to 0.8 range. While inner sleeve 16 is effective when merely loosely positioned within outer sleeve 14, if desired a longitudinal adhesive line or series of spots may be applied to the lower (and/or upper) surface of inner sleeve 16 (as seen in FIG. 1) to hold inner sleeve 16 more precisely in position along the centerline of strip 10.

This back-up tape may be used in welding any suitable metal. The metal should be weldable at temperatures below the fusion temperature of the fabrics used in sleeves 14 and 16 and in strip 10. Typical metals include aluminum, magnesium, steel, titanium, bronze, copper-nickel, and other mixtures and alloys thereof. When the tape is used with the higher-melting metals, the sleeve and strip fabrics should be made from correspondingly higher melting refractory fibers, since many of the advantages of this back-up tape will be lost if fusion or other degradation of fiber sleeves is allowed to occur.

Figure 2:
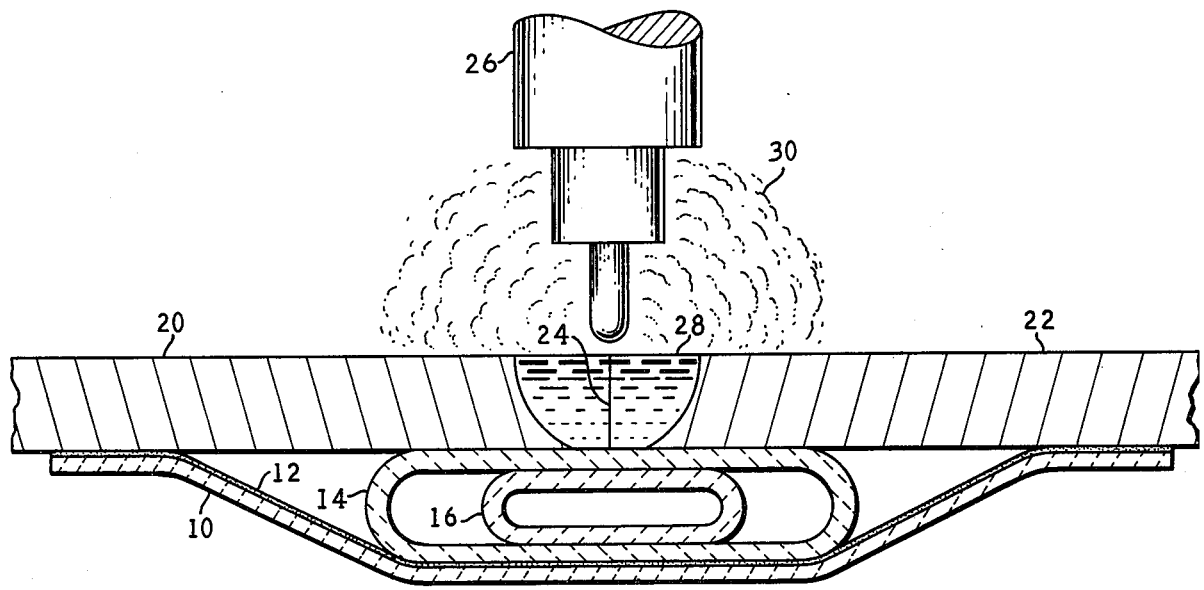
FIG. 2 is a schematic cross-section through the welding back-up tape in use during welding.

Use of the welding back-up tape of this invention is illustrated in FIG. 2, which shows a transverse section through the tape and a structure being welded.

Cover sheet 18, if any, is removed from an assembled back-up tape of suitable length. Adhesive layer 12 is activated, if necessary, and the tape is pressed against the structure (here, aluminum sheets 20 and 22). The adhesive along the margins of strip 10 removably bond the tape of sheets 20 and 22, holding sleeves 14 and 16 against the sheets along weld line 24. A conventional TIG (tungsten inert gas) welding head 26 is moved along line 24, heating the edges of sheets 20 and 22 above the fusion temperature, forming a fused zone 28. A blanket of an inert gas 30 is maintained over the fused zone 28.

Sleeves 14 and 16 support the underside of fused zone 28, preventing drop-through of molten metal. Since sleeve 14 is not degraded by the welding heat, no contamination of fused zone 28 can occur. As welding head 26 passes on, fused zone 28 cools and solidifies, producing a bead having a slightly crowned upper bead and a desirable flat under bead.

In a typical case, first and second sleeves 14 and 16 may have circumferences of about 2.36 inches and 1.18 inches, respectively, and may comprise woven elevated temperature resistant glass fiber electrical insulating sleeves such as are available from the Varglas Corporation under the Volon A-172 and LV-153 designations. The smaller sleeve is inserted in the larger and is pressed against the pressure sensitive adhesive surface of a 2 inch wide aluminized woven glass fiber tape, such as that available from the Mystik Company under the 7455 designation.

The tape is typically alinged with the abutting edges of two 0.22 inch 2219 aluminum sheets and pressed thereagainst. The butt joint is welded with a conventional TIG welding machine. The resulting weld, made with no filler wire addition, has a flat underside bead and a slightly convex upper bead. There is no evidence of thinning, undercutting or other defects. Examination by X-ray shows no weld contamination. Tensile strength of the weld is found to be higher than welds made in a similar manner without the back-up tape.

While certain specific materials, configurations and arrangements are detailed in the above description of preferred embodiments, these may be varied, where suitable, with similar results. For example, while two concentric sleeves are preferred in most cases, a single sleeve, or three or more sleeves, may be used if desired.

Other applications, variations and ramifications of this invention will occur to those skilled in the art upon reading this disclosure. These are intended to be included within the scope of this invention as defined in the appended claims.

We claim:

1. A welding back-up tape comprising:
an elongated narrow thin strip of flexible flat material;
an adhesive coating on one surface of said strip;
an outer tubular sleeve of woven refractory fibers;
said outer sleeve being in contact with said adhesive coating substantially along the centerline of said strip and bonded to said strip by said coating; and
at least one inner sleeve of woven refractory fibers located within and substantially concentric with said first sleeve;
said sleeves increasing in diameter from the innermost sleeve to said outer sleeve;
whereby said first sleeve and said strip may be pressed against a structure and held in place by said adhesive coating along the edges of said strip adjacent to said first sleeve.

2. The welding back-up tape according to claim 1 wherein said strip comprises a woven refractory fiber fabric having a diameter of from about 1 to 3 inches.

3. The welding back-up tape according to claim 1 wherein the ratio of circumference of said outer sleeve to the width of said strip is from about 0.2 to about 10.

4. The welding back-up tape according to claim 1 wherein a single inner sleeve is inserted in said outer sleeve and ratio of circumference of said inner sleeve to the circumference of said outer sleeve from about 0.5 to 0.8.

5. The welding back-up tape according to claim 1 where a single inner sleeve is inserted within said outer sleeve, at least a portion of the exterior surface of said inner sleeve carrying an adhesive coating bonding said inner sleeve to the interior surface of said outer sleeve so that said inner sleeve lies substantially along the centerline of said strip.

6. The welding back-up strip according to claim 1 wherein said adhesive coating is a pressure sensitive adhesive and said tape further includes a cover sheet having a surface treated to adhere to said adhesive but be easily releasable therefrom, said cover sheet having a width at least as great as the width of said strip, said cover sheet covering said sleeves and releasably bonded to said adhesive layer along the margins of said strip adjacent to said outer sleeve.

7. In a fusion welding system for butt welding aluminum structures comprising aluminum structures in close fitting contact along a weld line, a welding head on one side of said structures adapted to heat metal along said weld line to fusion temperature and a welding back-up assembly engaging the side of said structures opposite to said welding head and aligned with said weld line, the improvement wherein said welding back-up assembly comprises an elongated flexible strip of glass fiber fabric having an adhesive coating on one side, a pair of concentric inner and outer woven glass fiber sleeves, said outer sleeve partially flattened and bonded to said adhesive layer substantially along the centerline of said strip, said assembly pressed against said structures with said outer sleeve in contact with said weld line and said adhesive layer along the margins of said strip adjacent to said outer sleeve releasably bonding said assembly to said structures, said sleeves resisting significant degradation at the fusion temperature of aluminum.

8. The improvement according to claim 7 wherein said strip comprises a woven refractory fiber fabric housing a diameter of from about 1 to 3 inches.

9. The improvement according to claim 7 wherein the ratio of circumference of said outer sleeve to the width of said strip is from about 0.2 to about 1.0.

10. The improvement according to claim 7 wherein the ratio of the circumference of said inner sleeve the to circumference of said outer sleeve is from about 0.5 to 0.8.

11. The improvement according to claim 7 wherein at least a portion of the exterior surface of said inner sleeve carries an adhesive coating and said inner sleeve is bonded by said adhesive coating to the interior surface of said outer sleeve whereby said inner sleeve lies substantially along the centerline of said strip.

12. A method for fabricating a welding back-up tape which comprises the steps of
providing an elongated narrow strip of thin, flexible, flat material;
coating one surface of said strip with an adhesive layer;
preparing a sleeve assembly by inserting at least one inner woven refractory fiber tubular sleeve in an outer woven refractory fiber tubular sleeve with said sleeves concentric and increasing in diameter from the innermost sleeve to the outer sleeve;
placing said assembly along the approximate centerline of said strip;
partially flattening said sleeve assembly against said strip; and outer sleeve having a flattened width less than the width of said strip; and
bonding said outer sleeve to said strip by said adhesive.

13. The method according to claim 12 including the further step of providing an elongated cover sheet having a width at least as great as said strip, forming a coating on said cover sheet which will adhere to said adhesive but will easily release therefrom, and pressing said cover sheet to said strip over said sleeves whereby said cover sheet releasably a adheres to said adhesive layer along the margins of said strip adjacent to said sleeves.

14. The method according to claim 12 further including the steps of applying a bonding agent to at least portions of the outer surfaces of said at least one inner sleeve prior to assembly of said sleeve assembly and then bonding each sleeve to the next outer sleeve after assembly, with the centerline of each flattened inner sleeve lying substantially along the centerline of the flattened outer sleeve.

* * * * *